United States Patent
Singleton et al.

(10) Patent No.: US 11,863,280 B2
(45) Date of Patent: Jan. 2, 2024

(54) METHOD AND APPARATUS FOR DETERMINING THE DIRECTIONAL FREQUENCY RESPONSE OF AN ARRANGEMENT OF TRANSDUCER ELEMENTS

(71) Applicant: THE SECRETARY OF STATE FOR DEFENCE, Salisbury (GB)

(72) Inventors: Gregory Singleton, Salisbury (GB); Philip Henry Glasson, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 331 days.

(21) Appl. No.: 17/250,859

(22) PCT Filed: Sep. 14, 2019

(86) PCT No.: PCT/GB2019/000133
§ 371 (c)(1),
(2) Date: Mar. 12, 2021

(87) PCT Pub. No.: WO2020/070462
PCT Pub. Date: Apr. 9, 2020

(65) Prior Publication Data
US 2022/0060241 A1    Feb. 24, 2022

(30) Foreign Application Priority Data
Oct. 5, 2018  (GB) ..................................... 1816251

(51) Int. Cl.
*H04B 7/08*      (2006.01)
*G01N 29/22*     (2006.01)
(Continued)

(52) U.S. Cl.
CPC ........... *H04B 7/086* (2013.01); *G01N 29/221* (2013.01); *G01N 29/262* (2013.01); *G01S 7/54* (2013.01);
(Continued)

(58) Field of Classification Search
CPC .... H04B 7/086; H04B 7/0617; G01N 29/221; G01N 29/262; G01N 2291/106;
(Continued)

(56) References Cited

FOREIGN PATENT DOCUMENTS

| CN | 102608580 A | 7/2012 |
|----|-------------|--------|
| CN | 103744073 A | 4/2014 |

(Continued)

OTHER PUBLICATIONS

International Patent Application No. PCT/GB2019/000133, International Preliminary Report on Patentability dated Apr. 15, 2021, 7 pages.

(Continued)

*Primary Examiner* — Jean B Corrielus
(74) *Attorney, Agent, or Firm* — Kilpatrick Townsend & Stockton LLP (57) ABSTRACT

Techniques for determining the directional frequency response of an arrangement of transducer elements are disclosed. In an example, a method includes providing a simulation of locations of the transducer elements, in the spatial domain; providing a beamforming direction and a frequency range; converting the simulation of locations from the spatial domain into corresponding frequency response values in a spatial frequency domain, such that, for each frequency of a plurality of frequencies in the frequency range, a spatial frequency contour is defined, each of the spatial frequency contours intersecting at the origin; determining the frequency response by applying a transformation to the frequency response values for the provided beamforming direction and frequency range and translating the spatial frequency domain into a modified frequency domain; and outputting the frequency response.

16 Claims, 8 Drawing Sheets

(51) Int. Cl.
　　　*G01N 29/26*　　(2006.01)
　　　*G01S 7/54*　　(2006.01)
　　　*H04B 7/06*　　(2006.01)
　　　*H04R 3/00*　　(2006.01)
　　　*H04R 29/00*　　(2006.01)

(52) U.S. Cl.
　　　CPC .......... *H04B 7/0617* (2013.01); *H04R 3/005* (2013.01); *G01N 2291/106* (2013.01); *H04R 29/002* (2013.01); *H04R 29/005* (2013.01); *H04R 2201/401* (2013.01)

(58) Field of Classification Search
　　　CPC .... G01N 29/30; G01N 29/34; G01N 29/4472; G01S 7/54; G01S 3/8083; H04R 3/005; H04R 29/002; H04R 29/005; H04R 2201/401; G10K 11/34; G06F 30/20
　　　See application file for complete search history.

(56) References Cited

FOREIGN PATENT DOCUMENTS

| | | | |
|---|---|---|---|
| CN | 107026686 A | 8/2017 | |
| WO | WO-2014115088 A1 * | 7/2014 | ............. G01S 15/89 |

OTHER PUBLICATIONS

United Kingdom Patent Application No. GB1816251.1, Search Report dated Mar. 25, 2019, 3 pages.

United Kingdom Patent Application No. GB1913929.4, Combined Search and Examination Report dated Feb. 7, 2020, 6 pages.

International Patent Application No. PCT/GB2019/000133, International Search Report and Written Opinion dated Jan. 2, 2020, 12 pages.

Hampson et al., "Simulation of Beamforming Techniques for the Linear Array of Transducers," Faculty of computing and Information Technology Department of Robotics and Digital Technology Technical Report 95-3, Mar. 13, 1995, 32 pages, Monash University, Australia.

Petersen et al., "Simulation and design of a microphone array for beamforming on a moving acoustic source," Proceedings of Acoustics 2013, Nov. 17, 2013, pp. 1-8, vol. 1, Australian Acoustical Society.

Li et al., "A portable USB-based microphone array device for robust speech recognition," IEEE International Conference on Acoustics, Speech and Signal Processing, Apr. 19, 2009, pp. 1301-1304, IEEE, Piscataway, New Jersey.

InvenSense, "Microphone Array Beamforming," Application Note AN-1140, Dec. 31, 2013, pp. 1-12, retrieved from the Internet: URL:http://www.invensense.com/wp-content/uploads/2015/02/Microphone-Array-Beamforming.pdf, InvenSense Inc., San Jose, California.

* cited by examiner

METHOD AND APPARATUS FOR DETERMINING THE DIRECTIONAL FREQUENCY RESPONSE OF AN ARRANGEMENT OF TRANSDUCER ELEMENTS

TECHNICAL FIELD OF THE INVENTION

The invention relates to a computer-implemented method of determining the frequency response as a function of direction of an arrangement of transducer elements and a data processing device comprising a processor adapted to perform the method. The invention also relates to a computer program, and a computer-readable medium comprising instructions, which, when executed by a computer, cause the computer to carry out the method.

BACKGROUND TO THE INVENTION

Sensor arrays, such as those configured to transmit and/or receive electromagnetic or acoustic signals, typically comprise a plurality of sensor elements having a particular spatial arrangement. Sensor elements within sensor arrays are often combined using beamforming techniques to enable the directional transmission or reception of a signal. In general, the directional response of a sensor array typically varies according to, for example, the number of sensor elements in the array, and the characteristics of the particular spatial arrangement, such as, the geometric placement of the sensor elements and the distance between the sensor elements. The directional response of a sensor array may also vary with frequency.

It is often desirable to optimise, for example, number of elements and/or the geometric placement of sensor elements within an array in order to tailor the directional response of an array for a particular application. Determining the directional response of an array may be beneficial in determining the suitability of the array for a particular task.

One known way to determine the directional frequency response of an array is to construct the array and to take measurements of the directional frequency response. However, it can be time-consuming, inconvenient and expensive to construct an array to determine the operational performance. This approach may be especially inconvenient and costly in situations where it would be preferable to compare the performance of multiple arrays or for particular applications, such as, in the field of radio astronomy where the radius of an array may span several kilometres or more. Simulating the directional response of a particular sensor array is therefore often an important step in the fabrication process.

Methods of simulating the directional performance of sensor arrays are known. For example, such methods may require the conversion of a time domain signal into the frequency domain. Such methods may be most suitable for the calculation of the directional response of a sensor array for a single frequency, or for a small number of individual frequencies, as the execution time of such methods can increase appreciably with the number of frequencies simulated.

Therefore, it is an aim of the present invention to provide an alternative method for determining the response of an arrangement of transducer elements.

SUMMARY OF THE INVENTION

According to a first aspect, the invention provides a computer-implemented method of determining the frequency response as a function of direction of an arrangement of transducer elements, comprising controlling a computer processor to perform the steps of: (i) providing a simulation of locations of an arrangement of transducer elements, in the spatial domain; (ii) providing a beamforming direction and a frequency range; (iii) converting the simulation of locations from the spatial domain into corresponding frequency response values in a spatial frequency domain, having spatial frequency coordinates, such that: for each frequency of a plurality of frequencies in the frequency range, a spatial frequency contour, defined by a locus of points in the spatial frequency domain corresponding to the location of the frequency response values associated with the frequency response, as a function of direction, of the arrangement of transducer elements with respect to that frequency and the beamforming direction, passes through an origin of the spatial frequency domain, wherein each of the spatial frequency contours for each of the plurality of frequencies intersect at the origin; (iv) determining a frequency response, as a function of direction, of the arrangement of transducer elements by applying a transformation to the frequency response values for the provided beamforming direction and frequency range, wherein applying the transformation comprises translating the spatial frequency domain into a modified frequency domain, such that the contours avoid intersecting; and (v) outputting the frequency response values in the modified frequency domain, as the frequency response, as a function of direction, of the arrangement of transducer elements with respect to the beamforming direction.

According to a second aspect, the invention provides a data processing device comprising a processor adapted to perform the method according to the first aspect.

According to a third aspect, the invention provides a computer program comprising instructions which, when the program is executed by a computer, cause the computer to carry out the method according to the first aspect.

According to a fourth aspect, the invention provides a computer-readable medium comprising instructions which, when executed by a computer, cause the computer to carry out the method according to the first aspect.

In converting a simulation of the locations of an array of transducer elements from the spatial domain into corresponding frequency response values in the spatial frequency domain it is possible to determine the directional frequency response of an arrangement of transducer elements by translating the spatial frequency domain and the associated frequency response values into a modified frequency domain for a particular beamforming direction and selected frequency range. The method is particularly efficient, as only a single transformation into the spatial frequency domain need be performed for a given arrangement of transducer elements in order to determine the directional frequency response across a wide frequency band. Determining the directional response may be advantageous for applications where an understanding of the response value as a function of direction would be advantageous. For example, the invention may be particularly advantageous in optimising the number and arrangement of transducer elements within an array to produce the desired directional frequency response.

The resulting directional frequency response of the arrangement of transducer elements may be determined over a continuous frequency range.

Advantageously, the frequency response of the arrangement of the transducer elements may be determined for transducer elements arranged to transmit acoustic signals or electromagnetic signals. The frequency response of the arrangement of the transducer elements may be determined for transducer elements arranged to receive acoustic signals or electromagnetic signals. For example, the invention may be used to determine the directional frequency response of the arrangement of transducer elements in response to electromagnetic radiation from any frequency range, or ranges, within the electromagnetic spectrum. The invention may therefore applicable to determining the directional frequency response of an array for a wide range of applications, including, but not limited to, radar arrays, synthetic aperture radar arrays, radio astronomy arrays and microwave astronomy arrays. For example, the invention may be particularly applicable to a number of radio frequency applications, such as, in the frequency range 3 Hz to 3000 Hz as being particular advantageous for submarine communications; in the frequency range 3 kHz to 300 kHz as being particularly advantageous for navigation applications; in the frequency range 3 MHz to 3000 MHz as being particularly advantageous for RF communications; in the frequency range 30 GHz to 300 GHz as being particularly advantageous for radio astronomy and/or remote sensing; and in the frequency range 300 GHz to 3000 GHz as being particularly advantageous for medical imaging and/or remote sensing.

The invention may also suitable for determining the directional frequency response of an arrangement of transducer elements in response to an acoustic and/or pressure signal. Thus, the invention may also applicable to a wide range of acoustic applications, such as, determining the directional frequency response of sonar arrays, arrangements of audio speakers, and arrangements of microphones. For example, the invention may be advantageous for determining the directional frequency response in the frequency range 0.1 Hz to 10 Hz as being particularly advantageous for seismic sensor arrays. Alternatively, the invention may be advantageous for determining the directional frequency response of the arrangement of transducer elements in the range 20 kHz to 10000 kHz as may be advantageous for ultrasound and medical applications.

The invention may be particularly advantageous for applications where it is desirable to determine the performance of a sensor array over a broad frequency range. For example, the method may be especially advantageous when applied to audio signals. Audio signals, particularly natural audio signals, such as environmental sounds and speech, typically include wideband frequency information. Advantageously, the frequency range may comprise the range from about 20 Hz to 20 kHz. The frequency range 20 Hz to 20 kHz may be particularly advantageous for determining the frequency response of the arrangement of transducer elements in respect of audible sound. The invention may also be advantageous for determining the directional frequency response in one or more of the frequency ranges 300 Hz to 3000 Hz as may be advantageous for typical telephone line quality applications; 50 Hz to 7000 Hz as may be advantageous for HD voice telephone line quality applications; and 150 Hz to 15000 Hz as may be advantageous for intelligible speech applications. Using the method of the present invention, only a single transformation into the spatial frequency domain need be performed for a given arrangement of transducer elements in order to determine the directional frequency response across a range of frequencies, such as across a wide frequency band. The invention therefore provides for an efficient means of determining the directional frequency response of an arrangement of transducer elements.

The transducer elements may be arranged in one dimension, for example, in a row or a column. Alternatively, the transducer elements may be arranged in two dimensions or in three dimensions.

The transducer elements may be arranged as an array.

Advantageously, step (i) may comprise providing a spatial function defining the arrangement of transducer elements. A spatial function provides a convenient means for providing a simulation of the locations of an arrangement of transducer elements. For instance, step (i) may comprise providing a periodic spatial function.

The spatial function may be defined with respect to a sensor space, where the sensor space defines a geometry within the spatial domain containing the arrangement of transducer elements. To determine the spatial function, more preferably the periodic spatial function, the sensor space may be sampled. For example, the sensor space may be sampled using a grid of lattice points, more advantageously using a periodic grid of lattice points, even more advantageously using a periodic grid of equally-spaced lattice points. The grid of lattice points, periodic grid of lattice points and periodic grid of equally-spaced lattice points may be infinite.

One or more of the transducer elements may be positioned at locations corresponding to the lattice points and/or placed at arbitrary positions with respect to the lattice points. A value may be assigned to each lattice point corresponding to the presence, or otherwise, of any coincident or neighbouring transducer elements. For example, if every transducer element were to coincide with a lattice point, the value at each lattice point where there is a sensor may be specified as a positive value, such as, 1. The value of all the other lattice points, where no transducer element is present, may be specified, for example, as 0. Where the transducer elements are not positioned at locations corresponding to a lattice points, the value of the spatial function at each lattice point may be defined by applying an anti-aliasing filter, such as a sin c filter. For example, the anti-aliasing filter may be applied such that each transducer element is represented as a corresponding group of values at neighbouring lattice points.

The spacing between the lattice points within the sampling grid may be selected to optimise the frequency range for which the frequency response of the arrangement of transducer elements may be determined. The spacing between the lattice points in the beamforming direction may be selected as one quarter of the shortest wavelength of interest or selected as less than or equal to one quarter of the shortest wavelength of interest. The spacing between the lattice points in directions orthogonal to the beamforming direction may be selected as one half of the shortest wavelength of interest or selected as less than or equal to one half of the shortest wavelength of interest.

The period of the periodic spatial function may be selected to control the resolution of the determined frequency response. In particular, the periodicity may be selected to control the fidelity to which one frequency may be distinguished from another frequency. For example, the periodicity may be controlled by selecting the degree of empty sampling space surrounding the arrangement of transducer elements. The ratio of the period to the shortest wavelength of interest may define the number of different equally-spaced frequencies to be distinguishable between zero and the maximum frequency of interest. For example, to be able to distinguish 256 different equally-spaced frequencies, the period in each dimension should be at least 256 times larger than the shortest wavelength of interest.

Advantageously, step (i) may comprise allocating a weighting value to one or more of the simulated transducer elements. For example, the weighting value may be a measure of the gain of the associated transducer element. The weighting value may be selected to optimise the beamforming performance of a two-dimensional arrangement of transducer elements. For example, the weighting value may vary in relation to the selected frequency range.

A weighting value may be applied to one or more of the simulated transducer elements by applying a windowing function to the simulation of locations of an arrangement of transducer elements, more preferably, to the spatial function defining the arrangement of transducer elements. Such windowing functions may include, but are not limited to, a Hann window function, a Blackman window function and a Nuttall window function.

Step (iii) may comprise applying a Fourier Transform to the simulation of the locations of the arrangement of transducer elements. More preferably, step (iii) may comprise applying a Fast Fourier Transform to the simulation of the locations of the arrangement of transducer elements. Fourier Transforms, such as, spatial Fourier Transforms, provide a convenient and efficient means of converting the simulation of locations of an arrangement of transducer elements from the spatial domain into corresponding frequency response values in the spatial frequency domain.

The use of a periodic spatial function to provide the simulation of the locations of the arrangement of transducer elements may be particularly advantageous when using a Fourier Transform to convert the simulation of locations from the spatial domain into corresponding frequency response values in the spatial frequency domain.

For two-dimensional arrangements of transducer elements it may be advantageous to apply a two-dimensional Fourier Transform corresponding to the xy plane of the arrangement of transducer elements. For example, for a two-dimensional arrangement of transducer elements, the result of a Fourier Transform is constant in the direction orthogonal to the xy plane of the arrangement of transducer elements. Thereby, a two-dimensional Fourier Transform may be more efficient when determining the frequency response of an arrangement of transducer elements than applying a three-dimensional Fourier Transformation.

The directional frequency response of the arrangement of transducer elements is determined by applying a transformation to the frequency response values for the provided beamforming direction and frequency range.

For a given beamforming direction and frequency, within the frequency range, a locus of points may be defined where each point corresponds to a location of a frequency response value within the spatial frequency domain. Each of these locus of points defines a spatial frequency contour corresponding to a single frequency within the frequency range. Each of the spatial frequency contours, for each frequency of the plurality of frequencies, intersect at a common origin within the spatial frequency domain. The origin may be located at the position in the spatial frequency domain corresponding to wavenumber, k=0.

In two dimensions, each of the spatial frequency contours may define a path through the spatial frequency domain. In three dimensions, each of the spatial frequency contours may define a shell in the spatial frequency domain.

In two dimensions, each of the spatial frequency contours in the spatial frequency domain may be circular or substantially circular. In three dimensions, each of the spatial frequency contours in the spatial frequency domain may be spherical or substantially spherical.

Each point within the locus of points has an associated frequency response value. The frequency response value for a given point may correspond to, or be proportional to, the magnitude of the directional frequency response for the particular arrangement of the transducer elements and the specified beamforming direction. For example, the frequency response value may be measured in decibels.

Each of the locus of points and the respective frequency response values are translated, by translating the spatial frequency domain into a modified frequency domain, such that the resulting modified frequency contours in the modified frequency domain, for each of the plurality of frequencies, do not intersect.

In the modified frequency domain the resulting modified frequency contours may be defined by the locus of points in the modified frequency domain corresponding the locations of the frequency response values as associated with the frequency response, as a function of direction of the arrangement of transducer elements with respect to that frequency and the beamforming direction.

Advantageously, in step (iv) the step of applying a transformation may be performed such that the contours may be substantially parallel.

The locus of points and their respective frequency response values may be translated such that in the modified frequency domain the resulting modified frequency contours in two dimensions are circular or substantially circular contours. For example, each of the circular or substantially circular modified frequency contours may be centred about an origin in the modified frequency domain.

The locus of points and their respective frequency response values may be translated such that in the modified frequency domain the resulting modified frequency contours in three dimensions are spherical or substantially spherical modified frequency contours. For example, each of the spherical or substantially spherical modified frequency contours may be centred about an origin in the modified frequency domain.

Alternatively, the locus of points and their respective frequency response values may be translated such that in the modified frequency domain the resulting modified frequency contours are parallel linear frequency contours.

Applying the transformation of step (iv) may comprise translating the spatial frequency domain, having coordinates $k_x$, $k_y$, and optionally $k_z$, into the modified frequency domain, having coordinates $g_x$, $g_y$ and optionally $g_z$, using the transformation:

$$k_x = g_x - \sqrt{\sum_{i \in spatialcoordinates} g_i^2}, \text{ and } k_y = g_y, \text{ and optionally } k_z = g_z, \text{ wherein the beamforming direction is } x.$$

The directional frequency response of the arrangement of transducer elements may be outputted in three-dimensional polar coordinates derived from the Cartesian coordinates $g_x$, $g_y$, $g_z$ according to the transformation:

$$g_x = f \cos \varphi \cos \theta$$

$$g_y = f \sin \varphi \cos \theta$$

$$g_z = f \sin \theta$$

For an arbitrary beamforming direction, applying the transformation of step (iv) may comprise translating the spatial frequency coordinates k, of the spatial frequency domain, into coordinates g, of the modified frequency domain, using the vector transformation:

$$k = g - |g|e$$

wherein, e is a unit vector in the beamforming direction.

Applying the transformation of step (iv) may comprise translating the spatial frequency domain, having coordinates $k_x$ and $k_y$, into the modified frequency domain, having coordinates φ, f, using the transformation:

$$k_x = f(\cos \varphi - 1); \text{ and } k_y = f \sin \varphi,$$

wherein the beamforming direction is x, φ is the angle of the direction of the frequency response relative to the beamforming direction, and f is the frequency of the response.

For an arbitrary beamforming direction, in three dimensions, applying the transformation of step (iv) may comprise translating the spatial frequency domain, having coordinates $k_x$, $k_y$, and $k_z$, into the modified frequency domain using the transformation:

$$k_x = f(\cos \varphi \cos \theta - e_x)$$

$$k_y = f(\sin \varphi \cos \theta - e_y)$$

$$k_z = f(\sin \theta - e_z)$$

wherein, e is a unit vector in the beamforming direction, φ is the azimuth (horizontal) angle (relative to the x direction), θ is the elevation (vertical) angle (relative to the x direction), and f is the frequency of the response.

The beamforming direction may be any direction relative to the arrangement of transducer elements in which a signal is to be transmitted by the arrangement of transducer elements and/or any direction relative to the arrangement of transducer elements from which a signal is to be received by the transducer elements. For reception, the direction of travel of the signal to be detected is in the opposite direction to the beamforming direction. For transmission, the direction of travel of the signal to be detected is in the same direction as the beamforming direction.

The skilled person will appreciate the beamforming direction may be selected as any direction relative to the arrangement of transducer elements. The beamforming direction may be selected according to the intended use of the arrangement of the transducer elements, for example, according to the intended orientation of the transducer elements relative to an anticipated signal source and/or intended transmission target.

Advantageously, steps (i) to (iv) may repeated over time, more advantageously steps (ii) to (iv) may be repeated over time, so as to determine the directional frequency response over time. This provides a convenient means for determining the frequency performance of the arrangement of transducer elements over time. This may be particularly advantageous for determining the directional frequency response in real time.

Depending on the particular field of application, and intended use, it may be advantageous for the beamforming direction to remain unchanged relative to the arrangement of the transducer elements. This may be the case, for example, when determining the directional frequency response respective to a signal transmitted or received from a static target, for which the position, relative to the transducer elements, remains unchanged. Alternatively, the beamforming direction may be controlled such that it changes direction, over time, relative to the arrangement of transducer elements. This may be particularly advantageous for applications where it is desirable to transmit a signal to, or receive a signal from, a moving target or where it is desirable to scan an area over time.

The frequency response values in the modified frequency domain are outputted as the frequency response, as a function of direction, of the arrangement of transducer elements. For example, the directional frequency response may be outputted in polar coordinates and/or Cartesian coordinates.

The frequency response values may be outputted as a function of spatial frequency. For example, spatial frequencies may be measured in number of waves per unit distance.

The frequency response values may be outputted as a function of temporal frequency. For example, temporal frequencies may be measured in number of waves per unit time.

Spatial frequencies may be converted to temporal frequencies by applying a conversion factor, such as, the speed of propagation of a selected signal type through a medium of interest. For applications in which the medium of propagation remains unchanged, it may be assumed that all of the signal waves propagate at the same speed, such as, the speed of sound in air, or the speed of electromagnetic radiation in a vacuum. The medium of interest may be selected for the particular application from the group comprising: a vacuum; a gas, such as air; a liquid medium, such as fresh water or sea water; and a solid medium.

The method may further comprise the step of controlling a computer processor to generate an evaluation metric of the performance of the array. The evaluation metric may be derived from the frequency response, as a function of direction, of the arrangement of transducer elements. For example, the evaluation metric may be the directivity index.

Directivity index may provide an indication of the degree of directionality of the response of the arrangement of transducer elements. In particular, the directivity index may be used to provide for a comparison of performance of the arrangement of the transducer elements in the selected beamforming direction in relation to the performance from all directions about the arrangement of transducer elements. For example, the directivity index may provide for a comparison of the power received from the beamforming direction in relation to the average power received from all directions about the arrangement of transducer elements. The directivity index may be expressed as a ratio.

The invention may be used to monitor the expected performance of an arrangement of transducer elements. For example, the directional frequency response determined by steps (i) to (iv) may be compared with a measured frequency response of an arrangement of transducer elements. The comparison may be used to determine whether or not there is any variance between the determined directional frequency response and the measured response. For example, the comparison may be used to determine whether or not there is any variance between the determined directional frequency response and the measured response over time.

Advantageously, the invention may be part of a system comprising an arrangement of transducer elements, a data processing device according to the second aspect of the invention, a means for measuring directional frequency response of an arrangement of transducer elements, and a processor adapted to compare the directional frequency response determined by the method of the first aspect of the invention with a measured directional frequency response of the arrangement of transducer elements. The data processing device according to the second aspect of the invention may be the processor adapted to compare the directional frequency response determined by steps (i) to (iv) with a measured directional frequency response of the arrangement of transducer elements.

The arrangement of the transducer elements may be configured such that one or more of the transducer elements may be arranged so as to be selectable to contribute to the beamforming function of the system, wherein only the contributions of those transducer elements which have been selected will contribute to the beamforming function of the array.

The arrangement of transducer elements may be configured so as to be adaptable in response to any variance between the determined frequency response and measured frequency response. Such adaptations may include, but are not limited to, changing the selected beamforming direction, changing the selected operating frequency range; changing the physical arrangement of transducer elements, for example, by modifying the position of one or more of the transducer elements relative to the arrangement of transducer elements; deselecting one or more transducer elements such that they no longer form an active component of the system and do not contribute to the beamforming function; and/or selecting transducer elements which were not previously functioning as an active part of the system such that they contribute to the beamforming function or any combination thereof.

Variance between the expected performance of an array as determined by the method of the invention and the measured performance may occur for a several reasons, for example a malfunctioning element within the array.

BRIEF DESCRIPTION OF THE DRAWINGS

The invention will now be described, purely by way of example, with reference to the accompanying drawings, in which.

The drawings are for illustrative purposes only and are not to scale.

DETAILED DESCRIPTION

Figure 1:
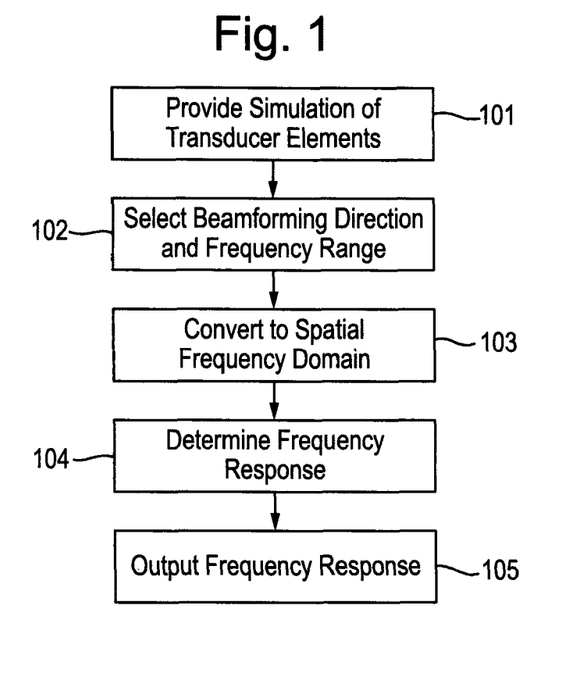
FIG. 1 shows a flow diagram of a method according to a first aspect of the invention.

With reference to FIG. 1, in a first embodiment of the method of determining the directional frequency response of an arrangement of transducer elements, a simulation of the locations of an arrangement of transducer elements is provided 101 as a periodic spatial function. The transducer elements, having a two-dimensional arrangement, are located in an xy plane of the spatial domain, having spatial coordinates x,y. The transducer elements could equally have a one-dimensional or a three-dimensional arrangement. The periodic spatial function is determined by sampling the sensor space with an infinite grid of lattice points. A sin c filter is used as an anti-aliasing filter to determine appropriate gain values at each of the lattice points due to the proximity, or otherwise, of any transducer elements.

A beamforming direction and frequency range are provided appropriate to the intended application 102, being to determine the directional frequency response of an arrangement of microphones for detecting audio signals. The beamforming direction is selected in the positive x direction and the frequency range is selected as 0 Hz to 24 kHz. A two-dimensional spatial Fast Fourier Transform is applied to the periodic spatial function to convert the periodic spatial function from the spatial domain to the spatial frequency domain 103. The spatial frequencies are converted into equivalent temporal frequencies by multiplication by the speed of propagation of sound in air.

The step of determining the directional frequency response 104 is achieved by applying a transformation to the frequency response values for the selected beamforming direction, and frequency range.

For each of the frequencies in the frequency range 0 Hz to 24 kHz, there is a locus of points, in the spatial frequency domain, having coordinates $k_x$, $k_y$, $k_z$. Each point has a respective frequency response value corresponding to the magnitude, in decibels, of the directional response of the arrangement of transducer elements at this frequency.

The locus of points for each of the frequencies defines a three-dimensional spherical spatial frequency contour passing through the origin k=0 of the spatial frequency domain.

The spatial frequency domain is translated into the modified frequency domain, by applying the transformation:

$$k_x = g_x - \sqrt{g_x^2 + g_y^2 + g_z^2}, k_y = g_y, \text{ and } k_z = g_z$$

where $g_x$, $g_y$, $g_z$ are the modified frequency coordinates of the resulting modified frequency domain. Each of the spatial frequency contours is translated, such that, when mapped into the coordinates in the modified frequency domain, the modified frequency contours are arranged as a nested family of spherical contours, each being centred on the origin.

The directional frequency response of the arrangement of transducer elements is outputted in three-dimensional polar coordinates derived from the Cartesian coordinates $g_x$, $g_y$, $g_z$.

Figure 2:
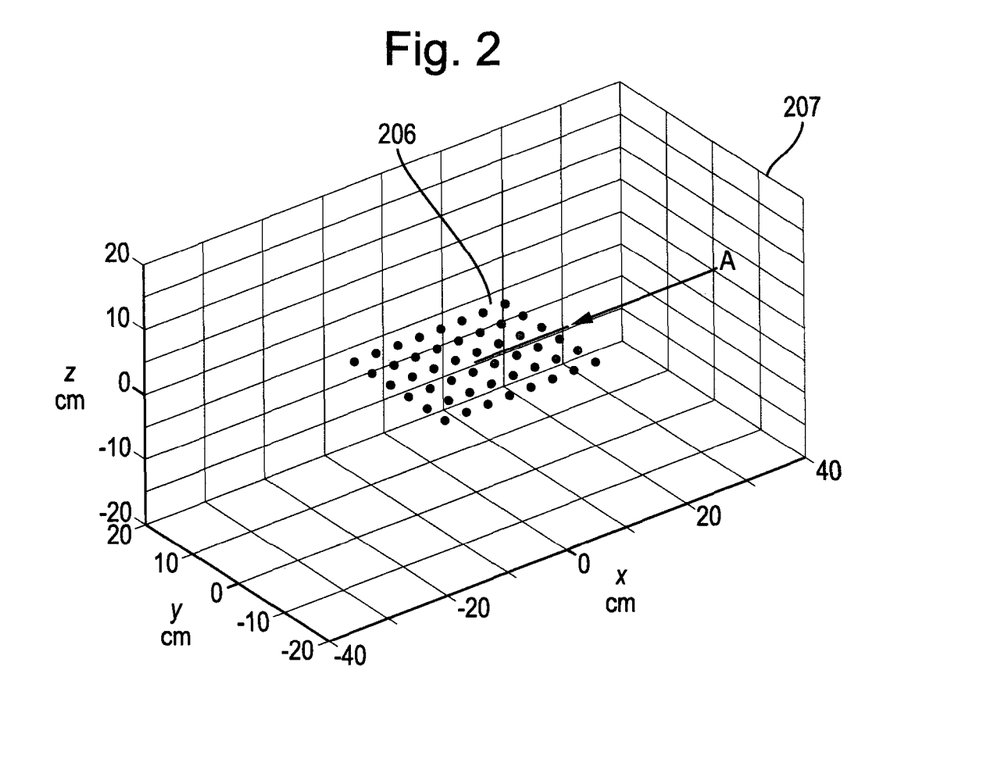
FIG. 2 shows a perspective view of an arrangement of transducer elements according to a first aspect of the invention.

With reference to FIG. 2, in a second embodiment of the method of determining the frequency response of an arrangement of transducer elements, 48 microphone transducer elements 206 are arranged in two dimensions in the xy plane of the spatial domain 207. Each of the 48 microphones is configured to receive sound in the selected frequency range of 0 Hz to 24 kHz. The beamforming direction is specified relative to the arrangement of transducer elements, in the positive x direction, to detect signals travelling in the negative x direction as indicated by arrow A. The frequency range of 0 Hz to 24 kHz is selected. Equally, other beamforming directions and frequency ranges may be selected.

The 48 microphones are equidistantly spaced at 36 mm in the x direction and 39 mm in they direction, and, for the purposes of determining the simulation of their locations, are defined within a sensor space having dimensions of 3.6 m×3.6 m. The resulting periodic spatial function of the arrangement of 48 microphones 206 is determined by application of a sin c anti-aliasing filter.

Figure 3:
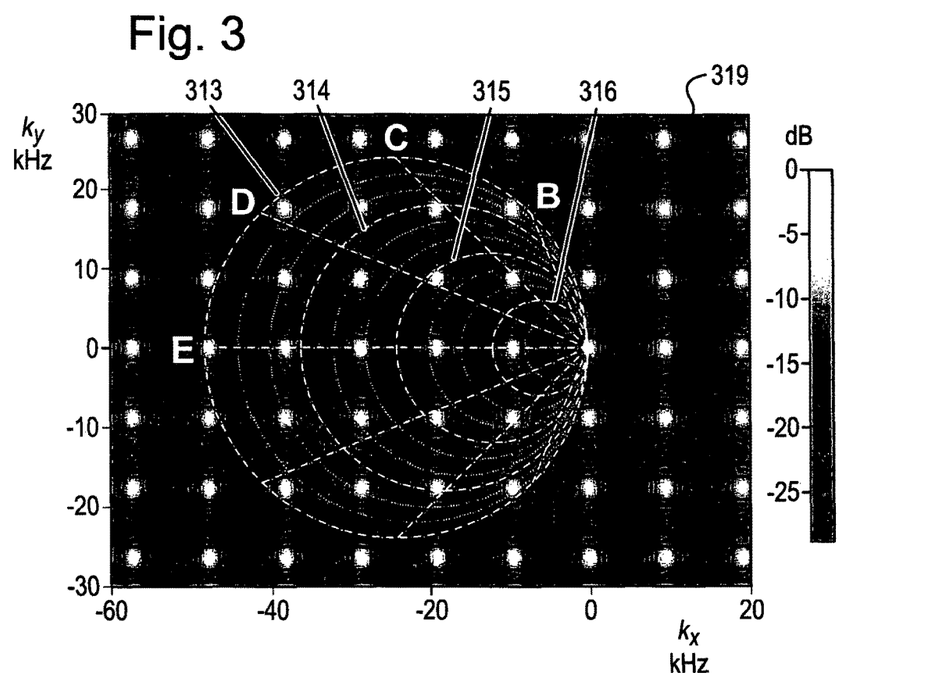
FIG. 3 shows a two-dimensional representation of the simulation of locations of the arrangement of transducer elements of FIG. 2 when converted into the spatial frequency domain according to a first aspect of the invention.

With reference to FIG. 3, by means of the application of a spatial Fast Fourier Transform to the periodic spatial function, the simulation of locations of the arrangement of microphones 206 are converted from the spatial domain 207 into corresponding frequency response values in the spatial frequency domain 319, having coordinates $k_x$, $k_y$, $k_z$. The spatial frequencies are converted to equivalent temporal frequencies in Hertz. The locus of points for each of the frequencies defines a spherical spatial frequency contour. For example, the sets of points corresponding to the frequencies 24 kHz, 18 kHz, 12 kHz, 6 kHz, define frequency contours 313, 314, 315, 316 respectively. All of the frequency contours 313, 314, 315, 316 pass through the origin k=0.

Each point within the spatial frequency domain 319 has a respective frequency response value in decibels, as indicated by the degree of shading in FIG. 3. The straight lines B, C, D and E correspond to the angles 45°, 90°, 135° and 180° with respect to the beamforming direction.

Figure 4:
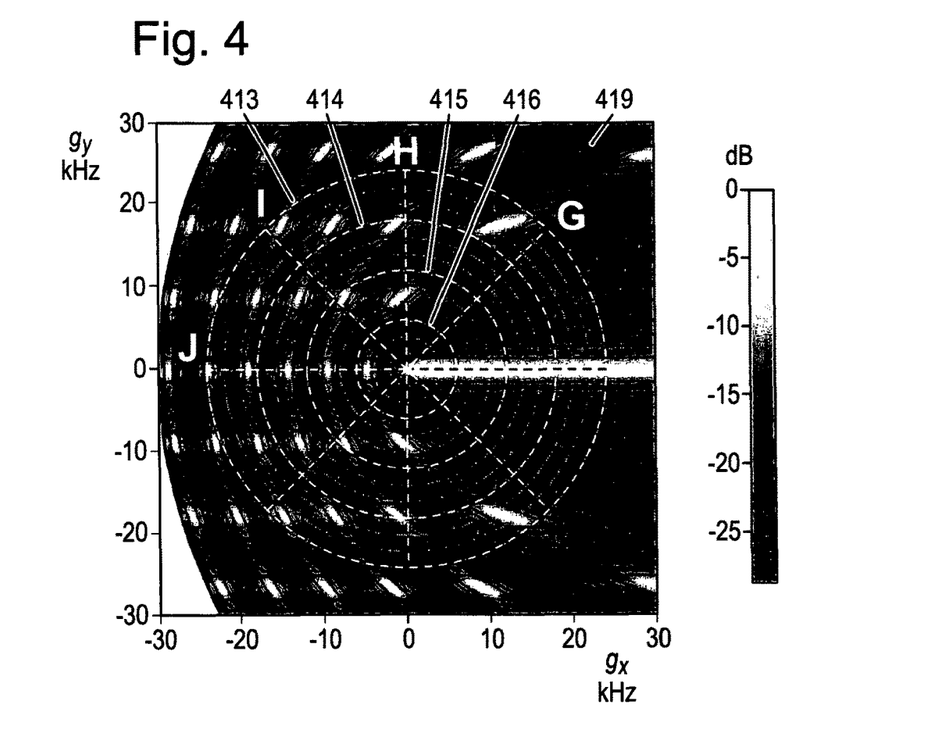
FIG. 4 shows a two-dimensional representation of the directional frequency response of the arrangement of transducer elements of FIG. 2, as a polar plot, according to a first aspect of the invention.

With reference to FIG. 4, the step of determining the directional frequency response is achieved by translating the spatial frequency domain 319, and the associated spatial frequency contours, into a modified frequency domain 419 according to the transformation:

$$k_x = g_x - \sqrt{g_x^2 + g_y^2 + g_z^2}, k_y = g_y, \text{ and } k_z = g_z$$

where $y_x$, $g_y$, $g_z$ are the coordinates of the resulting modified frequency domain 419.

Respective frequency response values, associated with the spatial frequency contours 313, 314, 315, 316 in the spatial frequency domain 319, are translated, such that the resulting contours 413, 414, 415, 416 for each of the plurality of frequencies in the modified frequency domain 419, are arranged as a nested family of spherical contours, each centred on the origin. Frequency contours 413, 414, 415, 416 are the translation of the spatial frequency contours 313, 314, 315, 316 respectively. The straight lines G, H, I and J correspond to the directional frequency response at angles 45°, 90°, 135° and 180° with respect to the beamforming direction.

Following the application of the transformation, the directional frequency response of the arrangement of microphones 206 is outputted in Cartesian coordinates ($g_x$, $g_y$), but could equally be outputted in polar coordinates ($\varphi$, f), as illustrated by the circular gridlines.

Figure 5A:
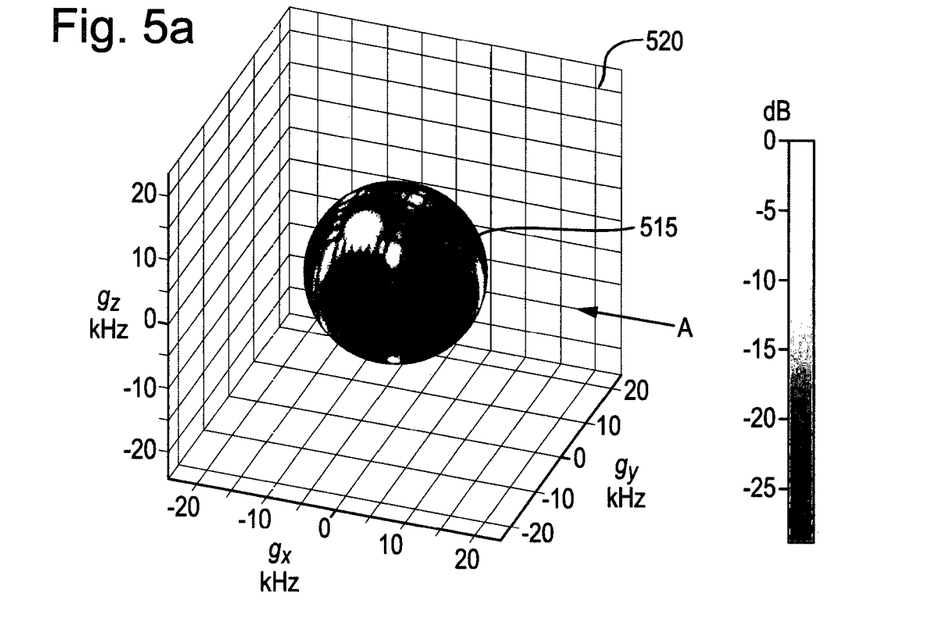
FIGS. 5a and 5b show a three-dimensional representation of the directional frequency response of the arrangement of transducer elements shown in FIG. 2, as a spherical polar plot, according to a first aspect of the invention.
Figure 5B:
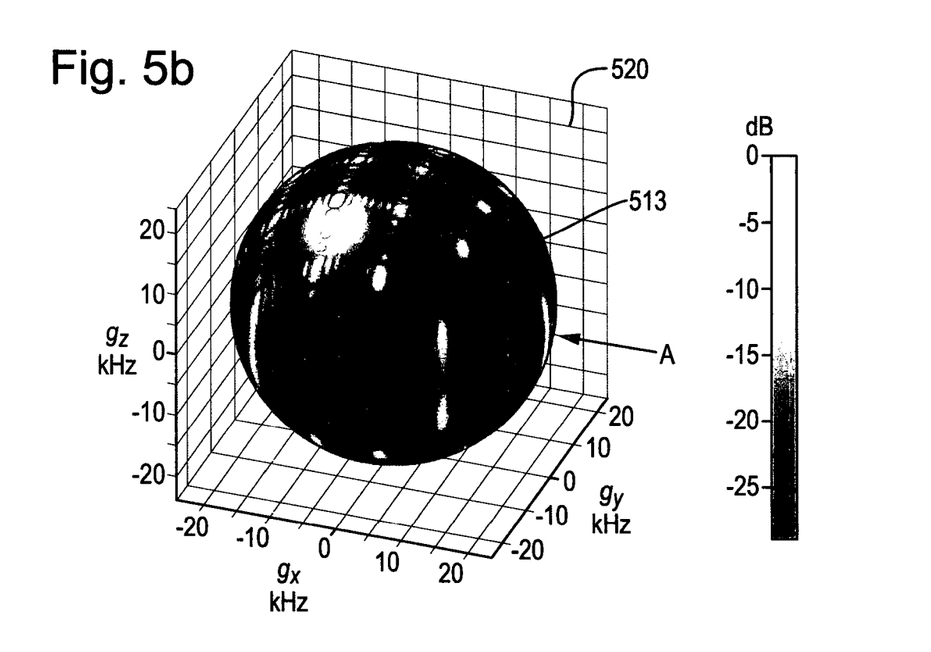

With reference to FIGS. 5a and 5b, the translated frequency contours 513, 515, of the modified frequency domain 520, are illustrated in three-dimensional Cartesian coordinates ($g_x$, $g_y$, $g_z$). Frequency contours 513 and 515 correspond to frequency contours 413 and 415 as illustrated in FIG. 4 in two dimensions.

Thereby, the directional frequency response of the arrangement of microphones is outputted, as the modified frequency domain 419, as illustrated in two dimensions in FIG. 4, and in three dimensions in FIGS. 5a and 5b.

Figure 6:
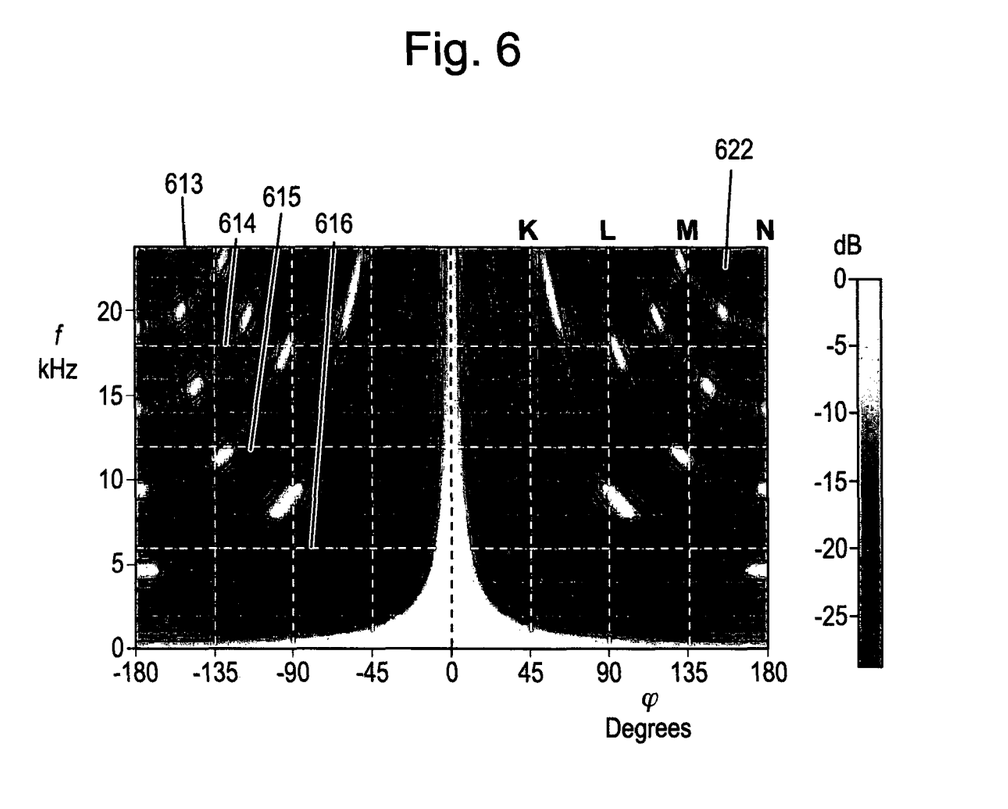
FIG. 6 shows a two-dimensional representation of the directional frequency response of the arrangement of transducer elements shown in FIG. 2, as a Cartesian plot, according to a first aspect of the invention.

With reference to FIG. 6, in a third embodiment of the method of determining the directional frequency response of an arrangement of transducer elements the modified frequency domain 622 is outputted, as the determined directional frequency response. The third embodiment is similar to the second embodiment, but the step of determining the directional frequency response is achieved by translating the spatial frequency domain 319, and the associated spatial frequency contours 313, 314, 315, 316, into a modified frequency domain 622 according to the transformation:

$$k_x = f(\cos \varphi - 1); \text{ and } k_y = f \sin \varphi,$$

where $\varphi$, f are the coordinates of the modified frequency domain 622, wherein $\varphi$ is the angle, with respect to beamforming direction, and f is the frequency, of the resulting directional frequency response.

The locus of points, and the respective frequency response values, associated with the spatial frequency contours 313, 314, 315, 316, are translated such that the frequency contours for each of the plurality of frequencies are arranged as respective parallel linear contours 613, 614, 615, 616. The straight lines K, L, M and N correspond to the angles 45°, 90°, 135° and 180° with respect to the beamforming direction.

Figure 7A:
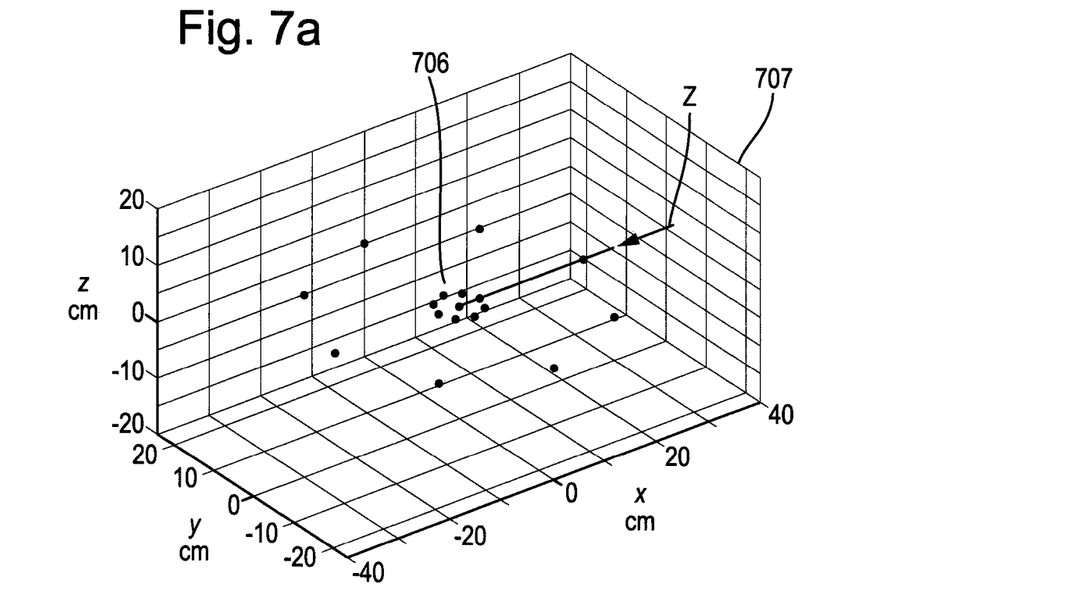
FIG. 7a shows a perspective view of a further arrangement of transducer elements according to a first aspect of the invention.
Figure 7B:
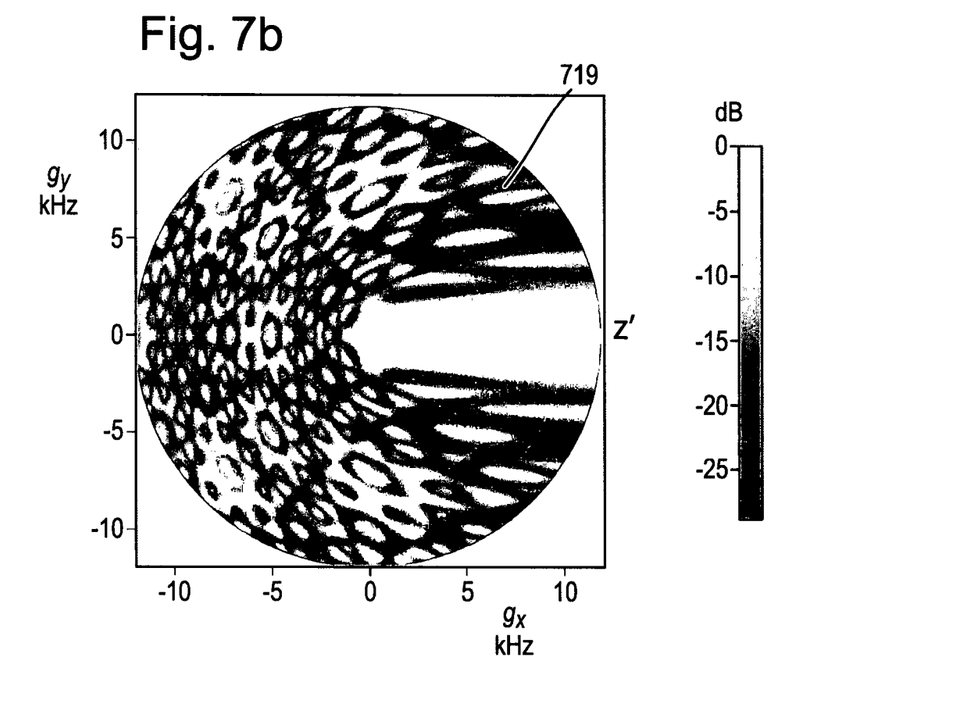
FIG. 7b shows a two-dimensional representation of the directional frequency response of the further arrangement of transducer elements shown in FIG. 7a, as a polar plot, according to a first aspect of the invention.

With reference to FIGS. 7a and 7b, in a fourth embodiment of the method of determining the frequency response of an arrangement of transducer elements, seventeen microphone transducer elements 706 are arranged in two-dimensional concentric rings in the xy plane of the spatial domain 707. Each of the seventeen microphones is configured to receive sound in the selected frequency range of 0 Hz to 12 kHz. The beamforming direction is specified relative to the arrangement of transducer elements 706, in the positive x direction, to detect signals travelling in the negative x direction as indicated by arrow Z. The frequency range of 0 Hz to 12 kHz is selected. Equally, other beamforming directions and frequency ranges may be selected.

The seventeen microphones 706 are arranged in three concentric rings, and, for the purposes of determining the simulation of their locations, are defined within a sensor space having dimensions of 7.2 m×7.2 m. The resulting periodic spatial function of the arrangement of seventeen microphones 706 is determined by application of a sin c anti-aliasing filter.

The simulation of locations of the arrangement of microphones are converted from the spatial domain 707, into corresponding frequency response values in the spatial frequency domain using a spatial Fourier Transform. The spatial frequencies are converted to equivalent temporal frequencies in Hertz. The locus of points for each of the frequencies defines a frequency contour.

The step of determining the directional frequency response, is achieved by application of the following transformation to the spatial frequency domain:

$$k_x = g_x - \sqrt{g_x^2 + g_y^2 + g_z^2}, k_y = g_y, \text{ and } k_z = g_z$$

where $g_x$, $g_y$, $g_z$ are the coordinates of the resulting modified frequency domain 719.

Respective frequency response values, associated with the spatial frequency contours, are translated, such that, the spatial frequency contours for each of the plurality of frequencies are arranged as a nested family of spherical contours, each centred on the origin.

Following the application of the transformation to each of the sets of points and the respective frequency response values, the frequency response of the arrangement of microphones 706 is outputted.

The directional frequency response of the arrangement of transducer elements is outputted in three-dimensional polar coordinates φ, θ, f derived from the Cartesian coordinates $g_x$, $g_y$, $g_z$ according to the transformation:

$$g_x = f \cos \varphi \cos \theta$$

$$g_y = f \sin \varphi \cos \theta$$

$$g_z = f \sin \theta$$

Figure 8:
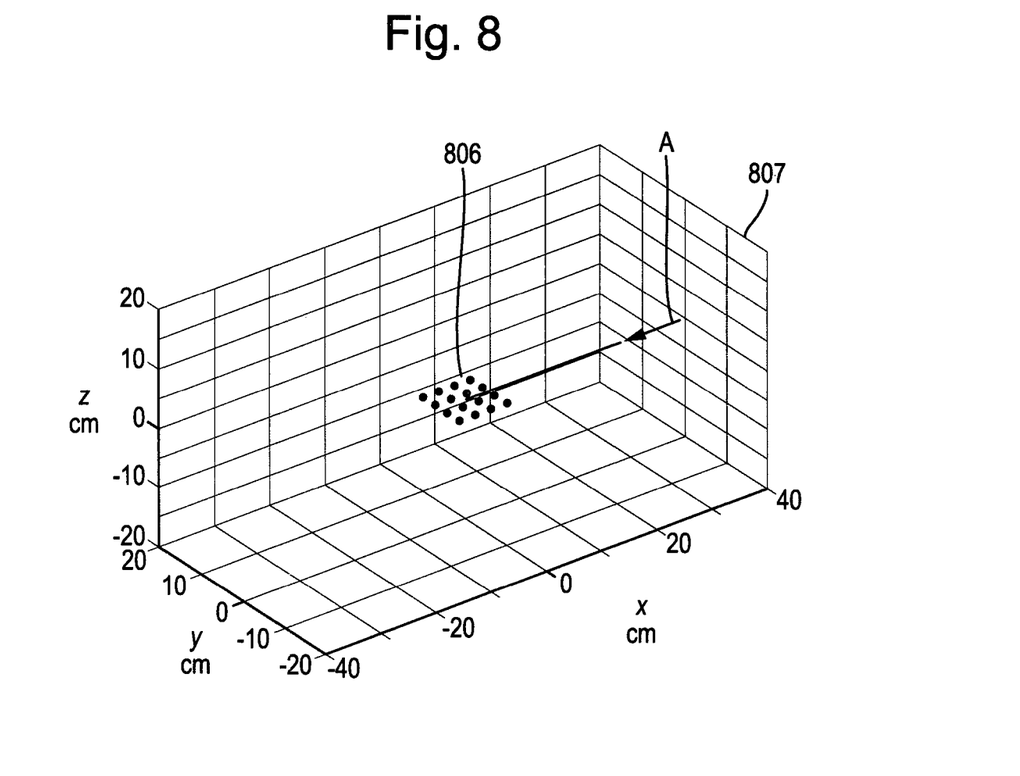
FIG. 8 shows a perspective view of yet a further arrangement of transducer elements according to a first aspect of the invention.

With reference to FIG. 8, in a fifth embodiment of the method of determining the directional frequency response of an arrangement of transducer elements an arrangement of 16 microphone transducer elements 806 are arranged in two dimensions in the xy plane of the spatial domain 807. Each of the 16 microphones is configured to receive sound in the selected frequency range of 0 Hz to 24 kHz. The beamforming direction is specified relative to the arrangement of the transducer elements 806, in the positive x direction, to detect signals travelling in the negative x direction. The frequency range of 0 Hz to 24 kHz is selected.

The simulation of the locations of the arrangement of 16 microphones 806 is provided by a periodic spatial function.

By means of the application of a spatial Fast Fourier Transform to the periodic spatial function, the simulation of locations of the arrangement of microphones 806 are converted from the spatial domain 807 into corresponding frequency response values in the spatial frequency domain, having coordinates $k_x$, $k_y$, $k_z$.

Figure 9A:
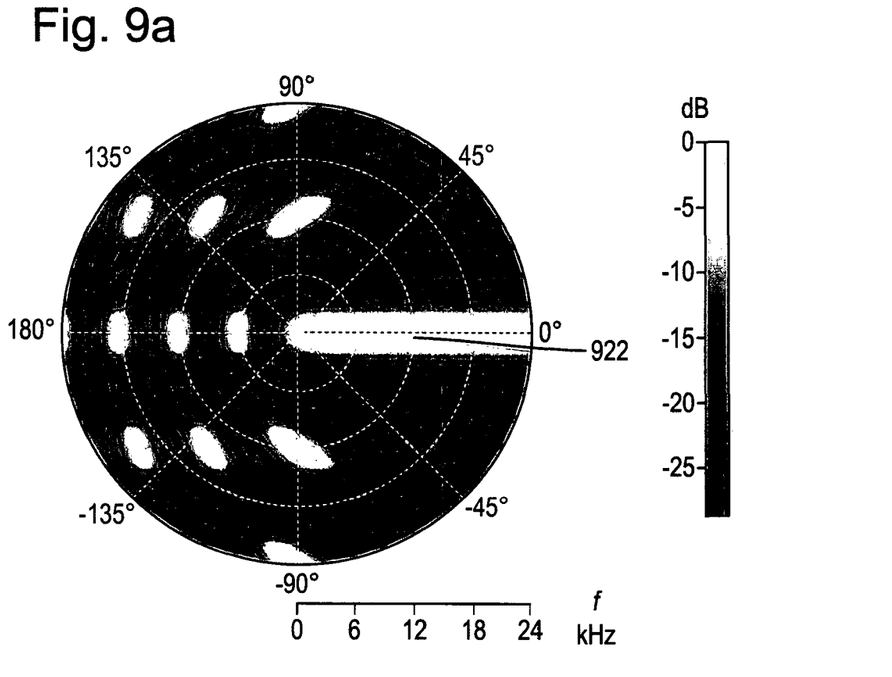
FIG. 9a shows a two-dimensional representation of the determined directional frequency response of the arrangement of transducer elements shown in FIG. 8, as a polar plot, according to a first aspect of the invention.

With reference to FIG. 9a, the step of determining the directional frequency response is achieved by translating the spatial frequency domain, and the associated frequency contours, into a modified frequency domain 919 according to the transformation:

$$k_x = g_x - \sqrt{g_x^2 + g_y^2 + g_z^2}, k_y = g_y, \text{ and } k_z = g_z$$

where $g_x$, $g_y$, $g_z$ are the coordinates of the resulting modified frequency domain 919. FIG. 9a shows a representation of the resulting directional frequency response in polar coordinates φ, θ, f, which are derived from the Cartesian coordinates $g_x$, $g_y$, $g_z$ according to the transformation:

$$g_x = f \cos \varphi \cos \theta$$

$$g_y = f \sin \varphi \cos \theta$$

$$g_z = f \sin \theta$$

Figure 9B:
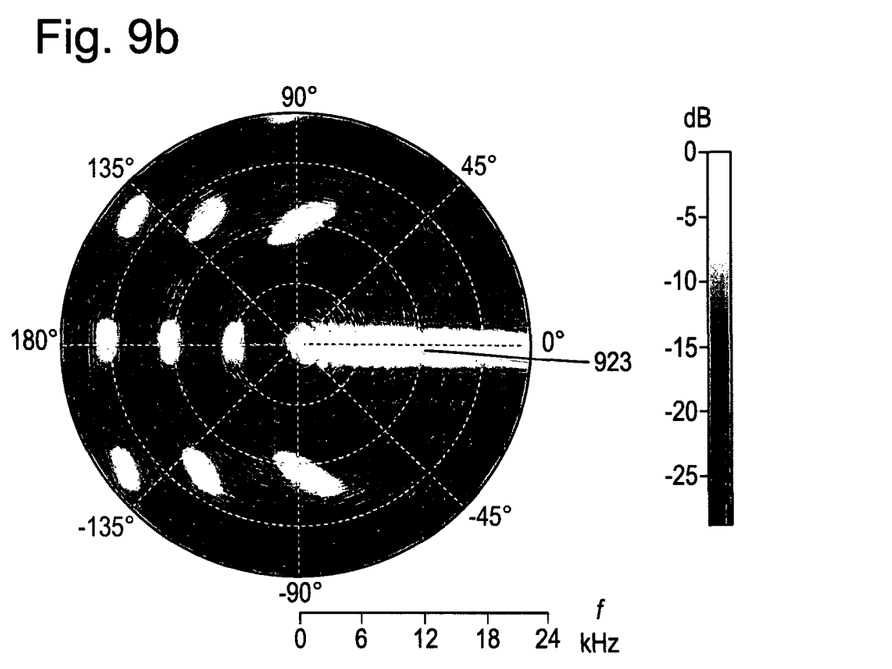
FIG. 9b shows a two-dimensional representation of the measured directional frequency response of the arrangement of transducer elements shown in FIG. 8, as a polar plot.

FIG. 9b shows the measured directional frequency response of the arrangement of microphones 806. The array of microphones was rotated on a turntable in an anechoic chamber in presence of test signals from a loudspeaker, from which the directional frequency response was calculated.

In both FIG. 9a and FIG. 9b, the degree of shading represents the magnitude of the response of the arrangement of microphones 806. As can be seen, there is a good correlation between the magnitude of the directional frequency response in both FIGS. 9a and 9b. For example, the main lobe 923, 922 is clearly discernible and shows good degree of similarity in both the measured and the determined frequency response.

Figure 10A:
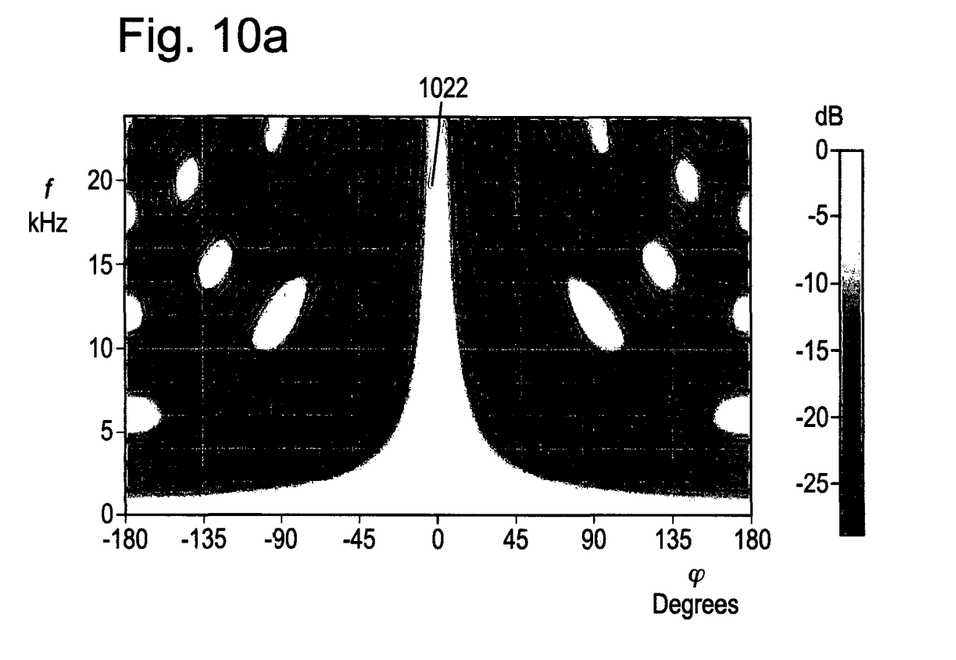
FIG. 10a shows a two-dimensional representation of the determined directional frequency response of the arrangement of transducer elements shown in FIG. 8, as a Cartesian plot, according to a first aspect of the invention.
Figure 10B:
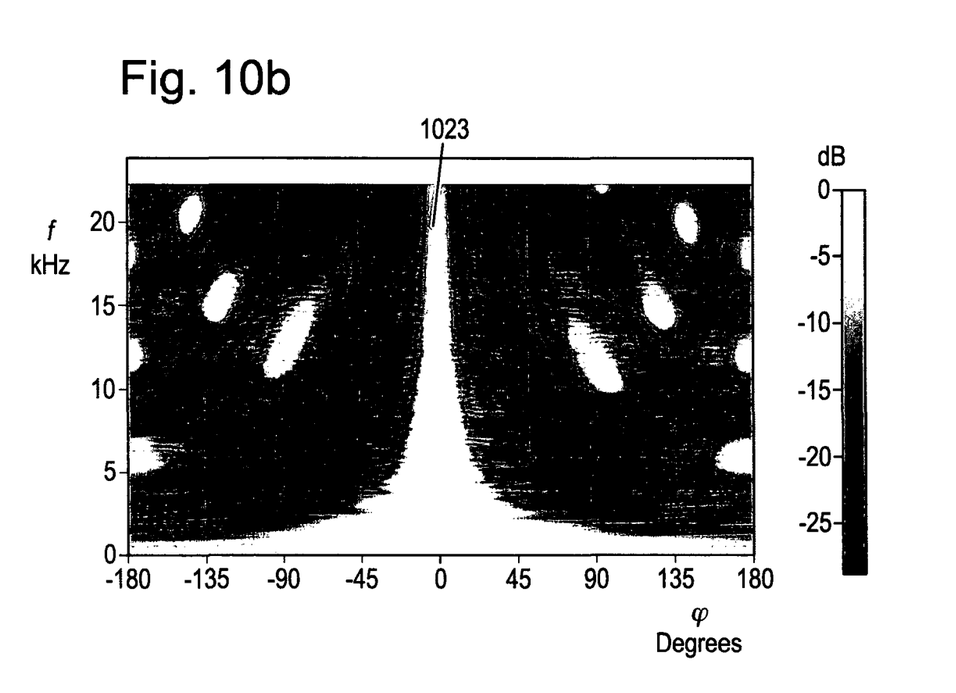
FIG. 10b shows a two-dimensional representation of the measured directional frequency response of the arrangement of transducer elements shown in FIG. 8, as a Cartesian plot.

With reference to FIGS. 10a and 10b, in a fifth embodiment of the method of determining the directional frequency response of an arrangement of transducer elements a measured directional frequency response and a determined directional frequency response of the arrangement of transducer elements 806 is outputted.

The fifth embodiment is similar to the fourth embodiment, but the step of determining the directional frequency response is achieved by translating the spatial frequency domain into a modified frequency domain according to the transformation:

$$k_x = f(\cos \varphi - 1); \text{ and } k_y = f \sin \varphi,$$

where φ, f are the coordinates of the modified frequency domain, wherein sp is the angle, with respect to beamforming direction, and f is the frequency, of the resulting directional frequency response. FIG. 10a shows a representation of the resulting directional frequency response as a Cartesian plot.

FIG. 10b shows a Cartesian representation of the measured directional frequency response of the arrangement of microphones 807, measured according to the method of embodiment 4 as used to produce figure the response illustrated in FIG. 9b.

In both FIG. 10a and FIG. 10b, the degree of shading represents the magnitude of the response of the arrangement of microphones 807. As can be seen, there is a good correlation between the magnitude of the directional frequency response in both FIGS. 10a and 10b. For example, the main lobe 1023, 1022 is clearly discernible and shows good degree of similarity in both the measured and the determined directional frequency response.

The invention claimed is:

1. A computer-implemented method for determining a frequency response as a function of direction of an arrangement of transducer elements, the method comprising:
   (i) providing a simulation of locations of the arrangement of the transducer elements, in a spatial domain;
   (ii) providing a beamforming direction and a frequency range;
   (iii) converting the simulation of locations from the spatial domain into corresponding frequency response values in a spatial frequency domain, the frequency response values having spatial frequency coordinates, such that:
      for each frequency of a plurality of frequencies in the frequency range, a spatial frequency contour, defined by a locus of points in the spatial frequency domain corresponding to the location of the frequency response values associated with the frequency response, as a function of direction, of the arrangement of the transducer elements with respect to that frequency and the beamforming direction, passes through an origin of the spatial frequency domain,
      wherein each of the spatial frequency contours for each of the plurality of frequencies intersect at the origin;

(iv) determining the frequency response, as a function of direction, of the arrangement of transducer elements by applying a transformation to the frequency response values for the provided beamforming direction and frequency range, wherein applying the transformation comprises translating the spatial frequency domain into a modified frequency domain, such that the contours avoid intersecting; and (v) outputting the frequency response values in the modified frequency domain, as the frequency response, as a function of direction, of the arrangement of the transducer elements with respect to the beamforming direction.

2. The computer-implemented method of claim 1, wherein applying the transformation is performed such that the contours are substantially parallel.

3. The computer-implemented method of claim 1, wherein applying the transformation further comprises translating the spatial frequency domain, having coordinates $k_x$, $k_y$, and optionally $k_z$, into the modified frequency domain, having coordinates $g_x$, $g_y$ and optionally $g_z$, using the transformation $k_x=g_x-$, and $k_y=g_y$, and optionally $k_z=g_z$, wherein the beamforming direction is x.

4. The computer-implemented method of claim 1, wherein applying the transformation further comprises translating the spatial frequency domain, having coordinates $k_x$ and $k_y$, into the frequency domain, having coordinates $\varphi$, f, using the transformation $k_x=f(\cos\varphi-1)$; and $k_y=f\sin\varphi$, wherein the beamforming direction is x.

5. The computer-implemented method of claim 1, wherein converting the simulation of locations comprises applying a Fourier Transform to the simulation of the locations of the arrangement of the transducer elements.

6. The computer-implemented method of claim 1, wherein providing the simulation of locations comprises providing a spatial function defining the arrangement of the transducer elements.

7. The computer-implemented method of claim 1, wherein providing the simulation of locations comprises allocating a weighting value to one or more of the transducer elements.

8. The computer-implemented method of claim 7 wherein the weighting value is a measure of a gain of an associated transducer element.

9. The computer-implemented method of claim 1 wherein the frequency response of the arrangement of the transducer elements is determined for transducer elements arranged to transmit acoustic signals or electromagnetic signals.

10. The computer-implemented method of claim 1 wherein the frequency response of the arrangement of the transducer elements is determined for transducer elements arranged to receive acoustic signals or electromagnetic signals.

11. The computer-implemented method of claim 1 wherein the frequency range comprises the range from about 20 Hz to 20 kHz.

12. The computer-implemented method of claim 1 wherein the method further comprises controlling a computer processor to generate an evaluation metric of a performance of the arrangement.

13. The computer-implemented method of claim 12 wherein the evaluation metric is a directivity index.

14. A data processing device comprising a processor that s adapted to perform the method of claim 1.

15. A non-transitory computer-readable medium comprising program instructions which, when executed by a processor, cause the processor to perform operations comprising:
(i) providing a simulation of locations of an arrangement of transducer elements, in a spatial domain;
(ii) providing a beamforming direction and a frequency range;
(iii) converting the simulation of locations from the spatial domain into corresponding frequency response values in a spatial frequency domain, the frequency response values having spatial frequency coordinates, such that:
for each frequency of a plurality of frequencies in the frequency range, a spatial frequency contour, defined by a locus of points in the spatial frequency domain corresponding to the location of the frequency response values associated with a frequency response, as a function of direction, of the arrangement of the transducer elements with respect to that frequency and the beamforming direction, passes through an origin of the spatial frequency domain,
wherein each of the spatial frequency contours for each of the plurality of frequencies intersect at the origin;
(iv) determining the frequency response, as a function of direction, of the arrangement of transducer elements by applying a transformation to the frequency response values for the provided beamforming direction and frequency range, wherein applying the transformation comprises translating the spatial frequency domain into a modified frequency domain, such that the contours avoid intersecting; and
(v) outputting the frequency response values in the modified frequency domain, as the frequency response, as a function of direction, of the arrangement of the transducer elements with respect to the beamforming direction.

16. A system comprising:
a non-transitory computer-readable medium storing computer-executable program instructions; and
a processing device communicatively coupled to the non-transitory computer-readable medium for executing the computer-executable program instructions, wherein executing the computer-executable program instructions configures the processing device to perform operations comprising:
(i) providing a simulation of locations of an arrangement of transducer elements, in a spatial domain;
(ii) providing a beamforming direction and a frequency range;
(iii) converting the simulation of locations from the spatial domain into corresponding frequency response values in a spatial frequency domain, having spatial frequency coordinates, such that:
for each frequency of a plurality of frequencies in the frequency range, a spatial frequency contour, defined by a locus of points in the spatial frequency domain corresponding to the location of the frequency response values associated with a frequency response, as a function of direction, of the arrangement of the transducer elements with respect to that frequency and the beamforming direction, passes through an origin of the spatial frequency domain,
wherein each of the spatial frequency contours for each of the plurality of frequencies intersect at the origin;

(iv) determining the frequency response, as a function of direction, of the arrangement of transducer elements by applying a transformation to the frequency response values for the provided beamforming direction and frequency range, wherein applying the transformation comprises translating the spatial frequency domain into a modified frequency domain, such that the contours avoid intersecting; and (v) outputting the frequency response values in the modified frequency domain, as the frequency response, as a function of direction, of the arrangement of the transducer elements with respect to the beamforming direction.

\* \* \* \* \*